(12) United States Patent
Zach et al.

(10) Patent No.: US 10,663,359 B2
(45) Date of Patent: May 26, 2020

(54) POLYMER MEASURING BEAM

(71) Applicant: MEGATERM PLUS SPOLKA Z ORGANICZONA ODPOWIEDZIALNOSCIA, Kielce (PL)

(72) Inventors: Piotr Zach, Warsaw (PL); Marek Jach, Kielce (PL)

(73) Assignee: MEGATERM PLUS SPOLKA Z ORGANICZONA ODPOWIEDZIALNOSCIA, Kielce (PL)

( * ) Notice: Subject to any disclaimer, the term of this patent is extended or adjusted under 35 U.S.C. 154(b) by 130 days.

(21) Appl. No.: 15/754,430

(22) PCT Filed: Sep. 29, 2015

(86) PCT No.: PCT/PL2015/000158
§ 371 (c)(1),
(2) Date: Feb. 22, 2018

(87) PCT Pub. No.: WO2017/034424
PCT Pub. Date: Mar. 2, 2017

(65) Prior Publication Data
US 2018/0292273 A1    Oct. 11, 2018

(30) Foreign Application Priority Data

Aug. 27, 2015 (PL) .......................... 413709

(51) Int. Cl.
*G01L 1/22* (2006.01)
*G01L 1/24* (2006.01)
*G01G 3/14* (2006.01)

(52) U.S. Cl.
CPC .............. *G01L 1/2243* (2013.01); *G01G 3/14* (2013.01); *G01L 1/24* (2013.01)

(58) Field of Classification Search
CPC ............ G01L 1/2243; G01L 1/24; G01G 3/14
See application file for complete search history.

(56) References Cited

U.S. PATENT DOCUMENTS 3,602,866 A * 8/1971 Saxl ...................... G01L 1/2225
338/5
3,680,372 A * 8/1972 Ormond ................ G01L 1/2218
73/862.629
(Continued)

FOREIGN PATENT DOCUMENTS

EP    1124118    8/2001
EP    2450686    5/2012
(Continued)

OTHER PUBLICATIONS

International Search Report and Written Opinion dated May 19, 2016, from the corresponding PCT/PL2015/000158.

*Primary Examiner* — Jonathan M Dunlap
(74) *Attorney, Agent, or Firm* — Katten Muchin Rosenman LLP

(57) ABSTRACT

A polymeric measuring beam comprising a core with a shaped stress concentrator with cylindrical delimiting surfaces and measuring systems or elements thereof located in the area of highest stress and uniformly bonded with the material of the beam core; the beam core being made of a thermoplastic polymeric or duroplastic polymeric material: thermosetting or chemically curing, is characterized in that the stress concentrator, in the longitudinal section of the beam, has a shape defined by at least one circle or at least one closed curve, symmetric or asymmetric relative to the vertical or horizontal axis of the local coordinate system of the concentrator, the shape of which is limited by two lines imposing the condition of convergence in the direction opposite to the desired stress increase gradient along the axis of the beam, and such shaped stress concentrator may be (Continued)

arranged symmetrically or asymmetrically relative to vertical or horizontal axis of the beam.

10 Claims, 12 Drawing Sheets

(56) References Cited

U.S. PATENT DOCUMENTS

| | | | | |
|---|---|---|---|---|
| 4,325,048 A * | 4/1982 | Zaghi | ............... | G01L 1/2225 338/3 |
| 4,365,520 A | 12/1982 | Zaghi | | |
| 4,450,922 A * | 5/1984 | Alexandre | ........... | G01L 1/2243 177/211 |
| 4,657,097 A * | 4/1987 | Griffen | ............... | G01L 1/2243 177/211 |
| 4,671,118 A * | 6/1987 | Hatamura | ............... | G01L 5/161 73/862.042 |
| 4,921,059 A * | 5/1990 | Woodle, IV | ......... | G01G 3/1408 177/136 |
| 5,052,505 A * | 10/1991 | Naito | ............... | G01G 3/1412 177/229 |
| 5,199,518 A * | 4/1993 | Woodle | ............... | G01G 3/1402 177/211 |
| 5,220,971 A | 6/1993 | Farr | | |
| 5,293,007 A * | 3/1994 | Darst | ............... | G01L 1/2243 177/229 |
| 5,604,336 A * | 2/1997 | Johnson | ............... | G01G 3/1412 177/229 |
| 5,773,729 A * | 6/1998 | Nahar | ............... | G01G 23/005 73/862.382 |
| 6,363,798 B1 * | 4/2002 | Gitis | ............... | G01L 1/2243 73/862.381 |
| 6,710,328 B1 * | 3/2004 | Mastro | ............... | G01L 1/24 250/227.11 |
| 6,766,701 B2 * | 7/2004 | Norling | ............... | G01L 1/2243 73/862.632 |
| 6,789,435 B2 * | 9/2004 | Hopkins | ............... | G01L 1/2243 177/211 |
| 6,898,989 B2 * | 5/2005 | Norling | ............... | G01L 1/125 73/862.632 |
| 9,726,559 B2 * | 8/2017 | Bodmer | ............... | G01G 21/244 |
| 9,766,113 B2 * | 9/2017 | Trakhimovich | ..... | G01G 3/1412 |
| 2002/0104690 A1 * | 8/2002 | Schurr | ............... | G01G 3/1412 177/211 |
| 2003/0131672 A1 * | 7/2003 | Norling | ............... | G01L 1/125 73/862.627 |
| 2003/0213122 A1 | 11/2003 | Koh | | |
| 2009/0254288 A1 * | 10/2009 | Chase | ............... | G01L 1/20 702/42 |
| 2010/0152707 A1 * | 6/2010 | Morris | ............... | A61M 1/008 604/523 |
| 2016/0047702 A1 * | 2/2016 | Bodmer | ............... | G01G 21/244 73/862.639 |

FOREIGN PATENT DOCUMENTS

| | | |
|---|---|---|
| PL | 218144 | 10/2014 |
| PL | 223819 | 11/2016 |

* cited by examiner

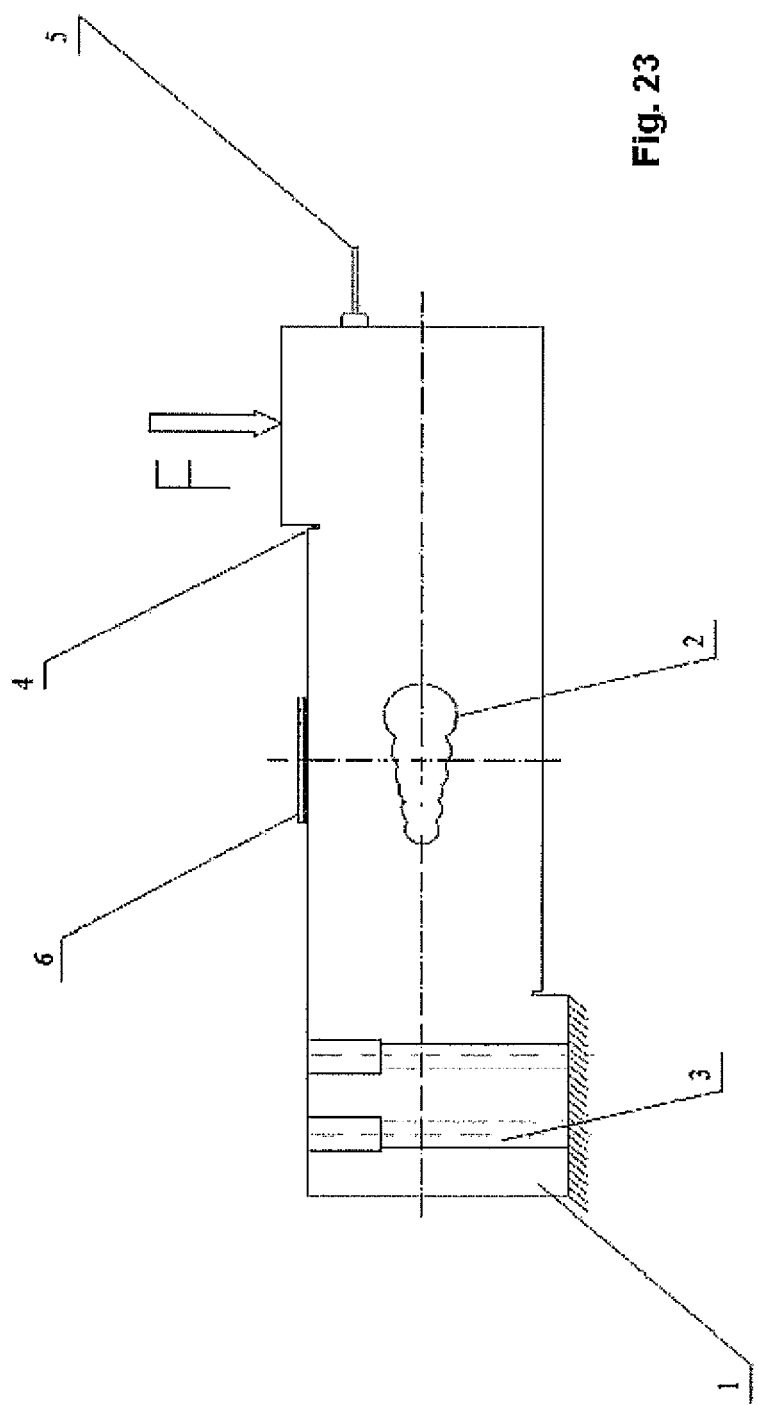

POLYMER MEASURING BEAM

The present invention relates to a polymer measuring beam for use in industrial systems for physical quantity measurements. A measurement system built on the basis of a beam component allows the measurement of quantities such as: force, pressure, torque, displacement, flow rate, path as well as the analysis of phenomena in continuous media, both in steady state and unbalanced. The measuring beam is intended in particular for use in weighing devices.

The state of the art discloses tensometric beams made of metal, mainly steel, on the surface of which are mounted tensometric elements, individually or in a specific electric circuit. Tensometric elements are mounted mechanically and are connected to the surface of the studied element by gluing techniques. Special adhesives are used: self-curing, for example, nitrocellulose adhesives (acetone) or polymerizable, for example, Bakelite phenolic adhesives, such as Cyjanopan, or others. The quality of adhesion of a tensometric sensor to a surface has a decisive influence on the precision of measurement. For that reason various adhesive mixtures are selected depending on measurement conditions and type of beam core material. On rough surfaces, such methods are used as, for example, gluing sensors onto steel strips and then soldering them or welding to the surface of a beam.

There are also known techniques of gluing tensometric elements which consist in mixing various types of adhesives, as well as in applying an additional layer of adhesive that coats the sensors from the outside, which layer provides an additional protective coating.

All the above-mentioned methods are aimed at the continuous improvement in the quality of glued connection between tensometric elements and the beam in order to obtain the highest possible precision and repeatability of measurement. In practice, though, the results are not fully satisfactory. The problem lies in durability of such glued connections, because, after some time, tensometric measurement systems separate, peel off or delaminate.

The shape of a tensometric beam is constantly improved and it can vary depending on beam type and measurement class. It must be stressed that metal processing has its limits in terms of obtaining an optimum shape, in particular the shape of inner recesses, of the so-called stress concentrator, which directly affects the processing time, complexity of operations and costs of manufacturing.

Patent specification PL218144 discloses a tensometric beam provided with tensometric measurement systems which is characterized in that it is made of a thermoplastic polymeric material or duroplastic thermosetting or chemically curing polymeric material, wherein tensometric measuring systems located in the areas of highest stress are uniformly bound with the polymer beam material.

Polish patent application P.398264 discloses a polymer measuring beam characterized in that it comprises optoelectronic measurement systems or elements thereof located in the highest stress area.

In the prior art, in both metal measuring beams and polymer measuring beams, the stress concentrator was characterized in that it was symmetrical relative to the vertical and horizontal axis of the local coordinate system linked to the concentrator and was located such that the centre of that local coordinate system linked to the concentrator was the same as the centre of the coordinate system of the beam element. The said shape was similar to a rectangle with rounded corners. The said shape resulted mainly from a manufacturing technology that consists in drilling or milling holes in the beam, which was the most economically viable method in the case of metals. In the case of polymers, the shape was duplicated as no consideration was given to the influence of shape and location of a stress concentrator on possible changes in the measuring element and its application. The shape of a stress concentrator was adjusted taking into account beam rigidity as well. That is why both the arrangement and shape of the stress concentrator remained symmetrical.

Although known solutions indicated the possibility of selecting the shape of a stress concentrator by means of a computer technology, the shape still remained unmodified, because the state of the art provided no teaching as to the influence of stress concentrator shape on the measurement precision.

There are also known measuring devices comprising tensometric systems and optoelectronic elements that are not beam measuring elements.

The aim of the present invention is to modify the geometry of a polymer measuring beam as a parametric function of the measured quantities by modifying the shape of a stress concentrator in order to further improve measurement precision.

A polymer measuring beam comprising a core with a shaped stress concentrator having cylindrical delimiting surfaces and measuring systems or parts thereof located in the area of highest stress and uniformly bonded with the beam core material, wherein the beam core is made of thermoplastic polymer material or duroplastic polymer material: thermosetting or chemically curing, is characterized, according to the present invention, in that the stress concentrator, in the longitudinal section of the beam, has a shape defined by at least one circle or at least one closed curve, symmetrical or asymmetrical relative to the vertical or horizontal axis of the local coordinate system of the concentrator, with the curve shape being delimited by two lines imposing the condition of convergence in the direction opposite to the desired gradient of tension increase along the axis of the beam. Such shaped stress concentrator can be located symmetrically or asymmetrically relative to the vertical or horizontal axis of the beam. The closed curve defining the stress concentrator may, in particular, have a shape of an ellipse, or a shape similar to a drop or a heart-like shape.

Unexpectedly, it turned out that the stress concentrator's shape similar to the contour of a drop significantly affects the nature and precision of measurements in devices using measuring beams, as it ensures a modulated increase in the stress gradient for a long measurement section while at the same time improving beam rigidity. On the other hand, modifying the position of the stress concentrator relative to the beam axis enables adjustment of the measuring component's properties, in particular its rigidity, to specific applications. Similar results may be obtained by changing the shape of the concentrator relative to its axes. Furthermore, the solution according to the present inversion makes it possible to extend the series of types of solutions concerning measuring elements by yielding desired rigidity that may have an impact on the measurement precision. This is particularly useful in weighing devices, both laboratory scales (precision class 5) and bulk scales (precision class 3).

The invention is shown in figures in its embodiments;

FIG. 1. presents the measuring beam in its first embodiment, with a stress concentrator whose delimiting surfaces are circular in the longitudinal section, the concentrator being aligned with the beam axis;

Figure 13:
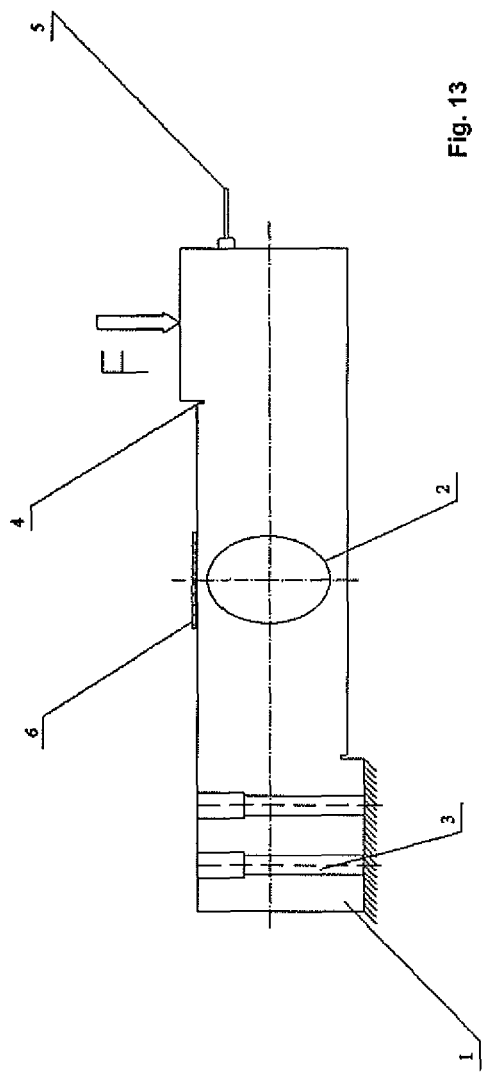
Figure 14:
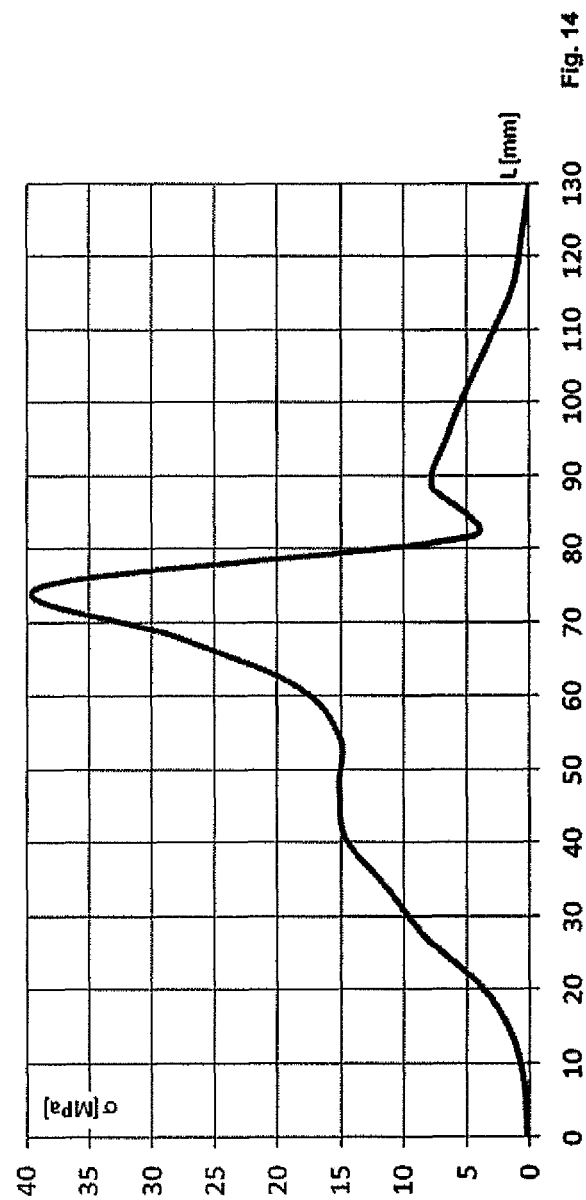
Figure 15:
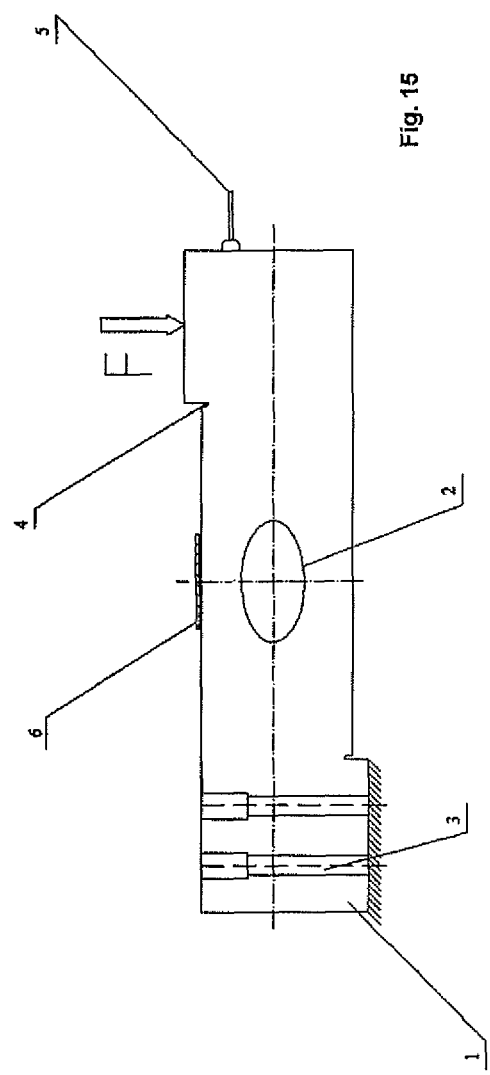
Figure 16:
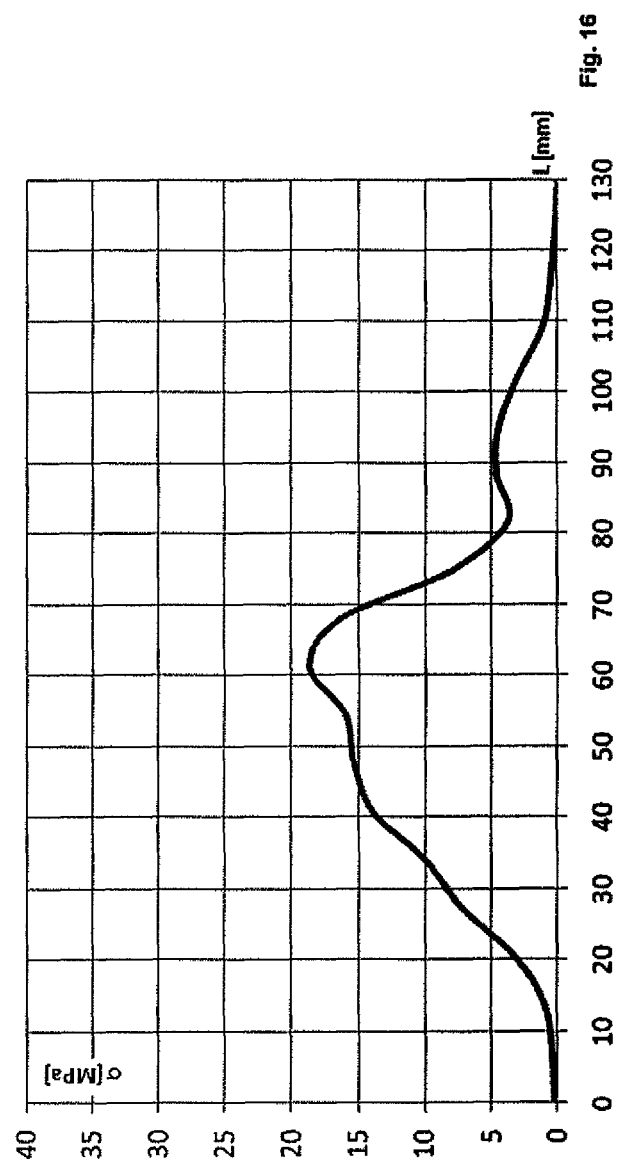
Figure 17:
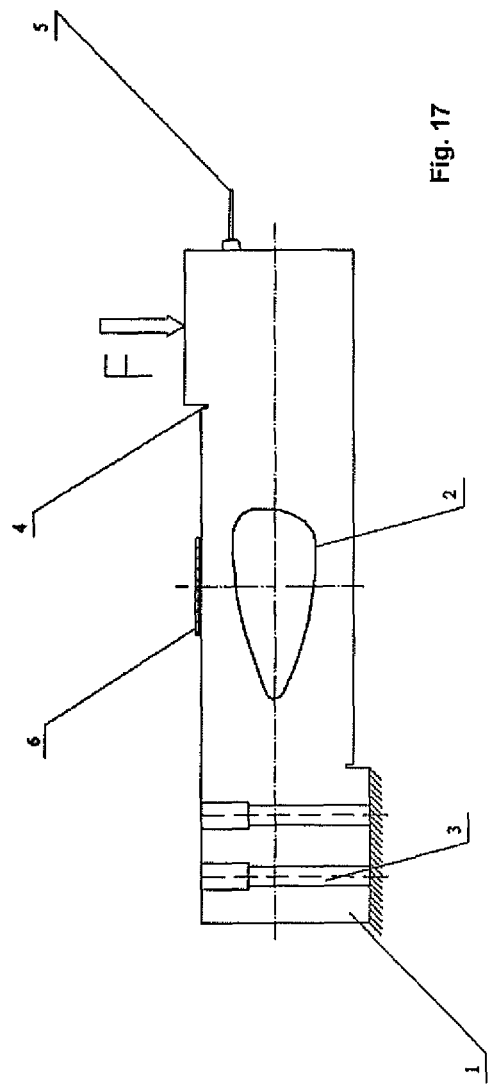
Figure 18:
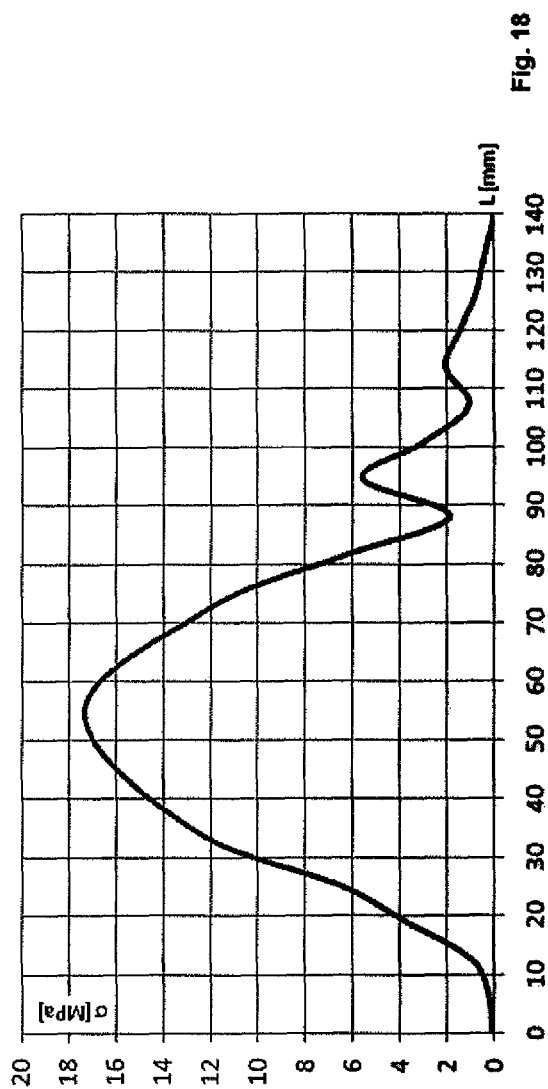
Figure 19:
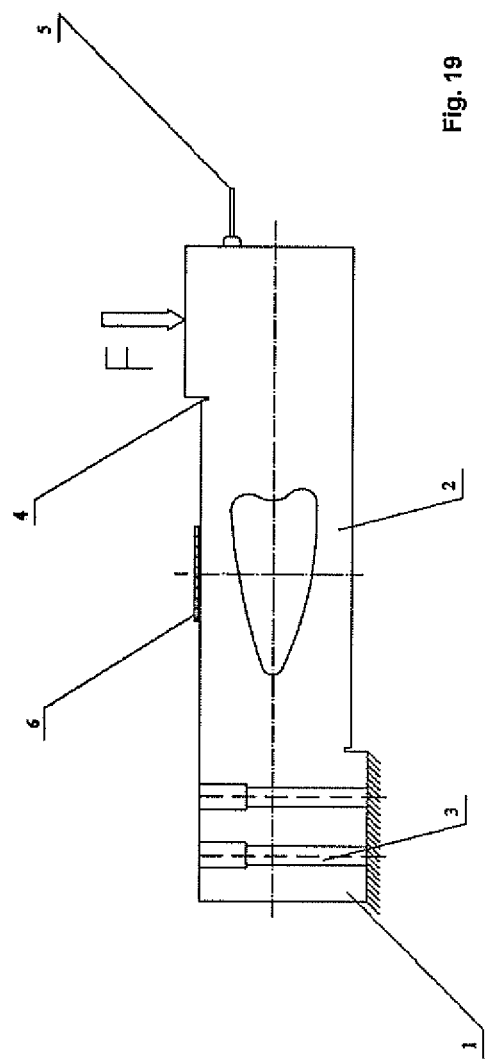
Figure 20:
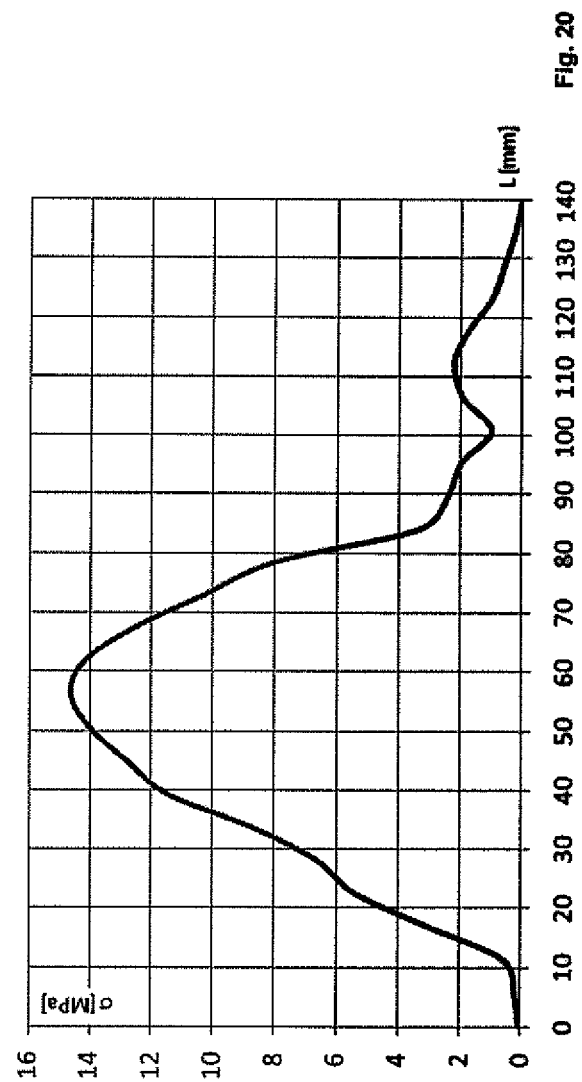
Figure 21:
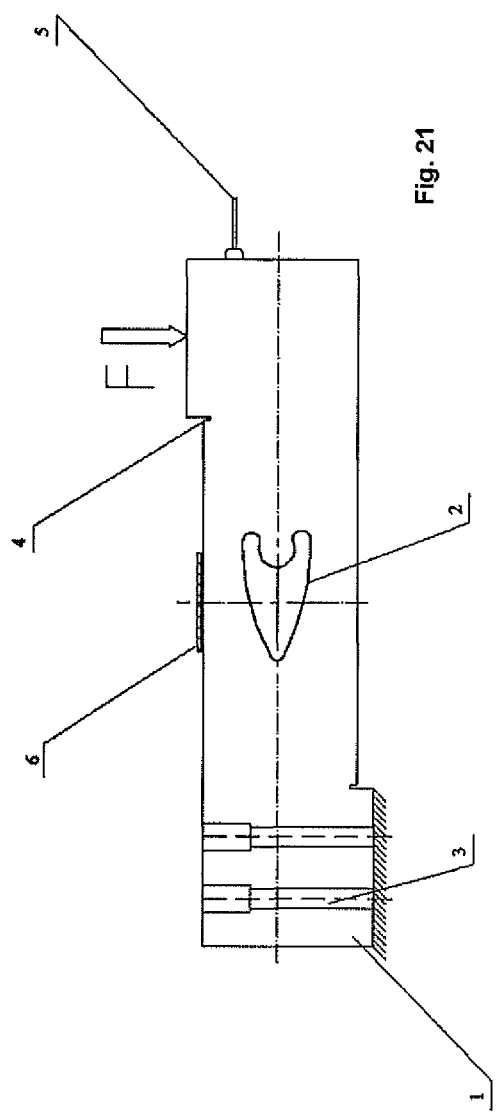
Figure 22:
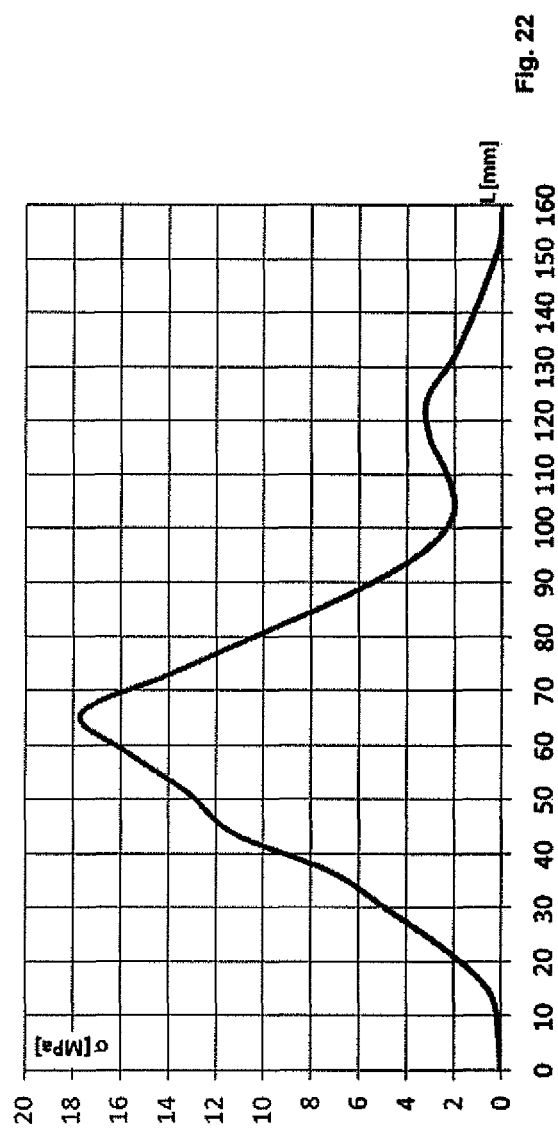

FIG. 13 presents the measuring beam in its next embodiment, with a stress concentrator whose delimiting surfaces have the shape of an ellipse in the longitudinal section, the concentrator being vertically aligned with the axes of the beam;

FIG. 14 shows a stress diagram for this embodiment;

FIG. 15 presents the measuring beam with the stress concentrator having the shape of an ellipse, being horizontally aligned with the axes of the beam;

FIG. 16 shows a stress diagram for this embodiment;

FIG. 17 presents a measuring beam with a stress concentrator in the shape of a drop;

FIG. 18 shows a stress diagram for this embodiment;

FIG. 19 presents a measuring beam with a stress concentrator whose delimiting surfaces in the longitudinal section have a hear-like shape;

FIG. 20 shows a stress diagram for this embodiment;

FIG. 21 presents a measuring beam with the stress concentrator having a heat-like shape with a big recess along the horizontal axis;

FIG. 22 shows a stress diagram for this embodiment; and

FIG. 23 shows a measuring beam with an arrangement of closed curves, each having a circular contour of a different diameter.

The polymer measuring beam is shown below in various embodiments, with each of the beams made of polyetherketone for loads of up to 3000 N.

Each of the polymer measuring beams according to this invention was tested using a system set up on the basis of a multichannel data acquisition board, with eight channels, controlled by a PC and making it possible to carry out measurements with a sampling step of 10 ms. The system is equipped with a set of sensors to measure inter alia: force—allowing up-to-date measurement, independent of the device activating the measurement, of load on the tested component, and displacement—allowing the measurement of displacement of the tested component. A universal testing machine was used as the testing setup. All measured signals, i.e.: the tested component—the polymer measuring beam, force sensor, displacement sensor and the execution of the testing set up movements—were connected to the data acquisition board through a measuring bridge.

Experimental tests of reference beams were carried out using study procedures testing setup control software. Tests were carried out for static loads of: 500 N, 1000 N, 1500 N, 2000 N, 2500 N, 3000 N.

EMBODIMENT 1

Figure 1:
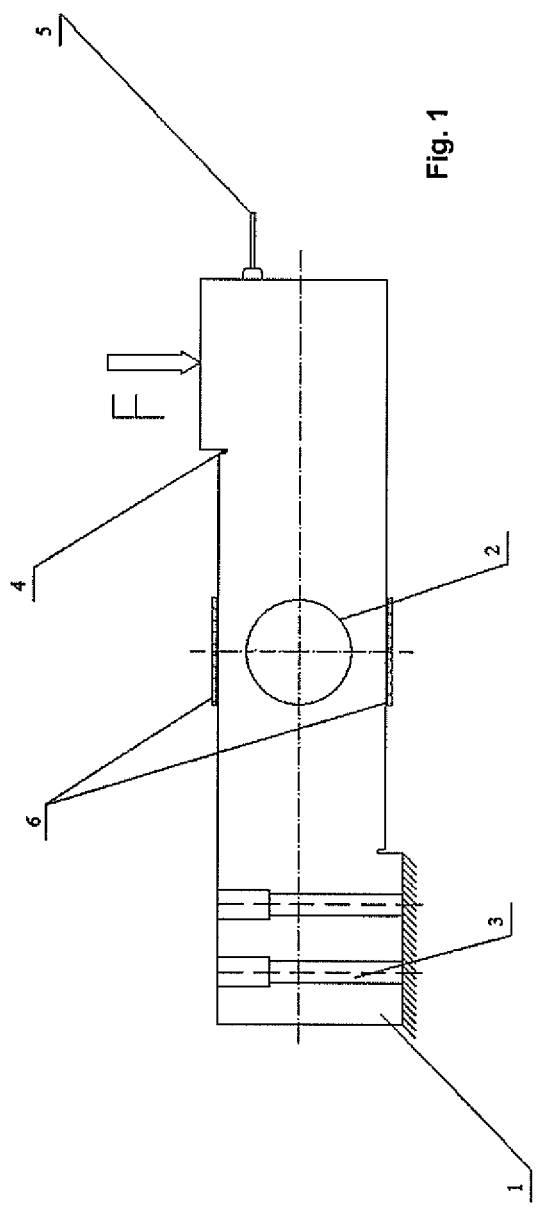

A polymeric measuring beam is in the form of a core 1 made of polyetherketone, which core 1 has a shape similar to a rectangular prism with dimensions: 130×32×30 (length× height×width expressed in mm). In the central part of core 1 of the beam there is located a shaped stress concentrator 2 with cylindrical delimiting surfaces which have a circular shape in the longitudinal section of the beam—FIG. 1. The axes of the local coordinate system of the stress concentrator 2 coincide with the axes of the coordinate system of core 1 of the measuring beam. On the surface of the beam there is located a tensometric measuring system 6, but other embodiments may also use an optoelectronic measuring system made of a different polymeric material than the material of core 1 which responds to a laser reader of the optoelectronic system; each of said systems is located in the area of highest stress and is uniformly bonded with the material of core 1 of the beam. Additionally, core 1 of the polymeric measuring beam is provided with typical mounting holes 3, technological undercuts 4 and a signal cable outlet 5.

Figure 2:
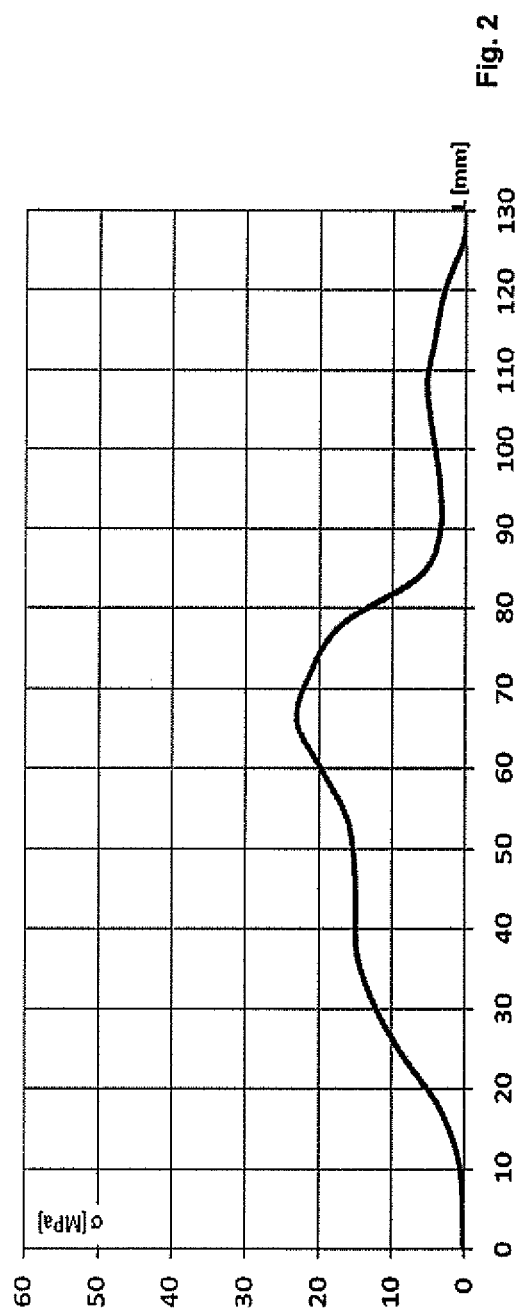
FIG. 2 shows a stress diagram for the measurement beam presented in FIG. 1 as a function of the beam length.

The polymeric measuring beam according to the present invention was examined within the whole measuring range, i.e. from 0 to 1000 N, and thus a stress distribution graph has been obtained, presented in FIG. 2.

The polymeric measuring beam presented in the embodiment is a symmetric element without indication of preferred working alignment. As results from the stress diagram, the beam may be used to produce a measuring system for universal applications.

EMBODIMENT 2

The measuring beam as in the first embodiment, having dimensions: 130×32×30 (length×height×width expressed in mm) with a stress concentrator 2 located asymmetrically, with cylindrical delimiting surfaces which have a circular shape in the longitudinal section of the beam. The vertical axis of the local coordinate system does not coincide with the axis of the coordinate system of core 1 of the beam element—FIG. 3 and FIG. 5. On the surface of the beam there is located a tensometric measuring system 6, but other embodiments may also use an optoelectronic measuring system or a measuring system made of a different polymeric material than the material of core 1 which responds to a laser reader of the optoelectronic system; each of said systems is located in the area of highest stress and is uniformly bonded with the material of core 1 of the beam. Additionally, core 1 of the polymeric measuring beam is provided with typical mounting holes 3, technological undercuts 4 and a signal cable outlet 5.

Figure 4:
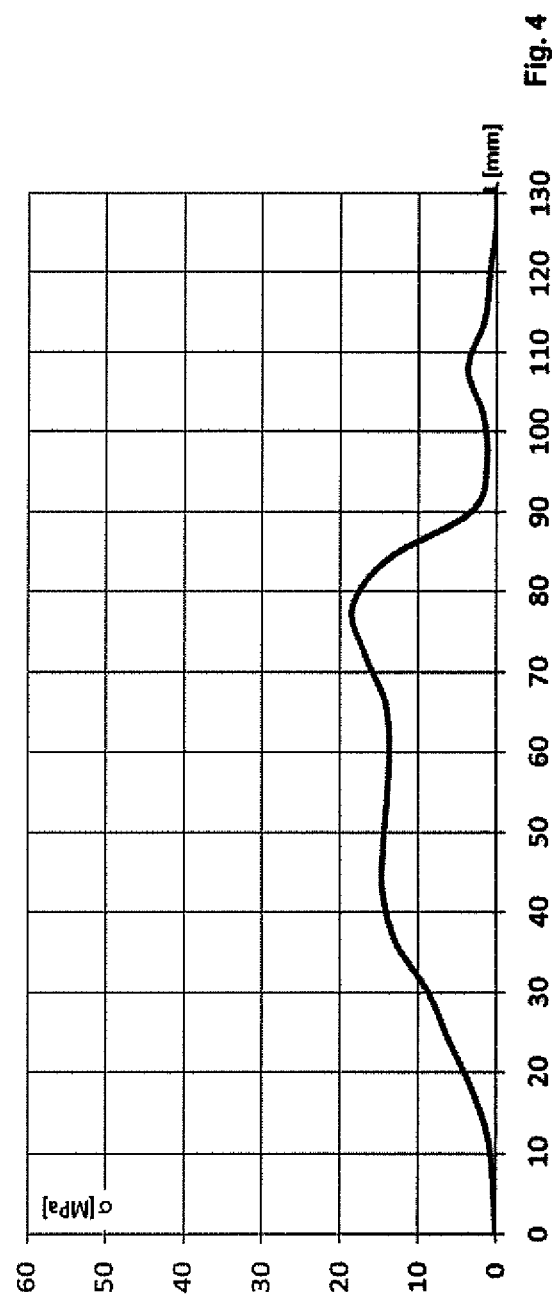
FIG. 4 shows a stress diagram for this embodiment.
Figure 6:
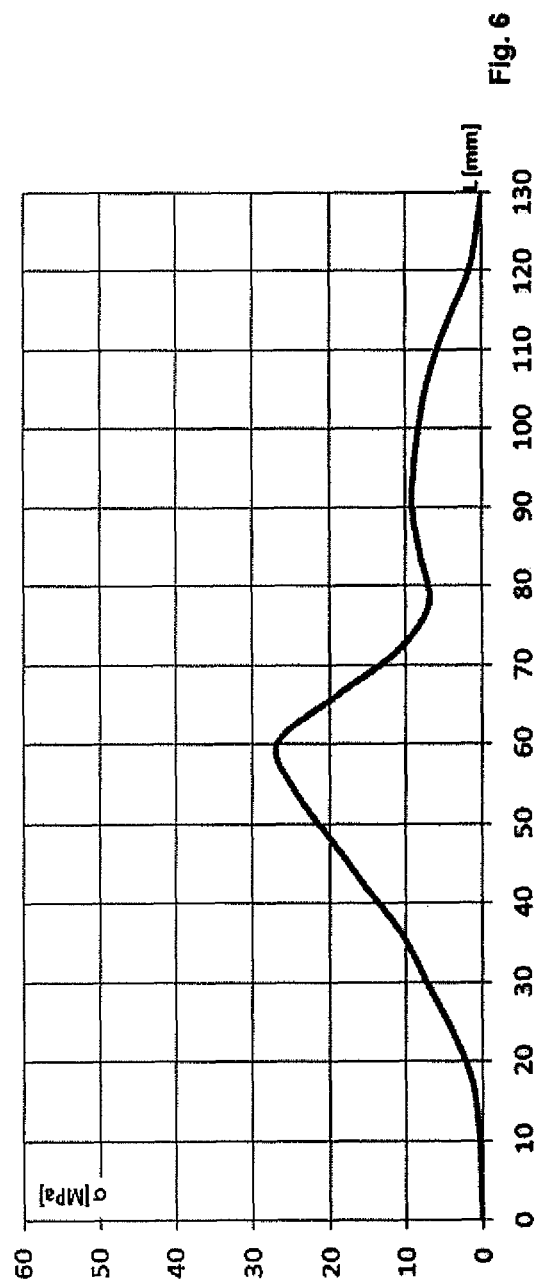
FIG. 6 shows a stress diagram for this embodiment.

The polymeric measuring beam according to the present invention was examined within the whole measuring range, i.e. from 0 to 1000 N, and thus a stress distribution diagram has been obtained, presented in FIG. 4 and FIG. 6.

Figure 3:
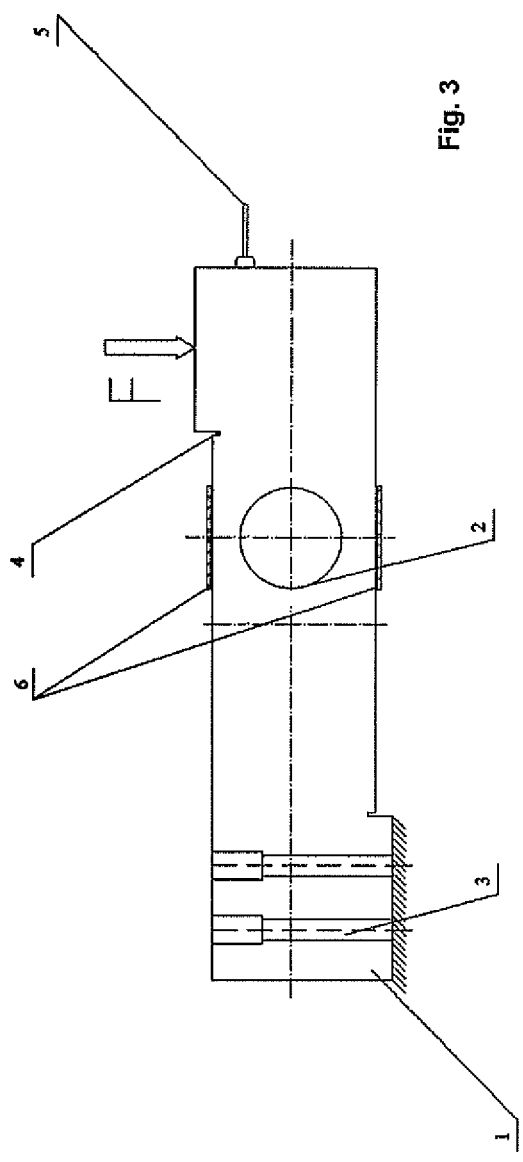
FIG. 3 shows a measurement beam as in the first embodiment, with the stress concentrator being situated on the right side of the vertical axis of symmetry of the beam.
Figure 5:
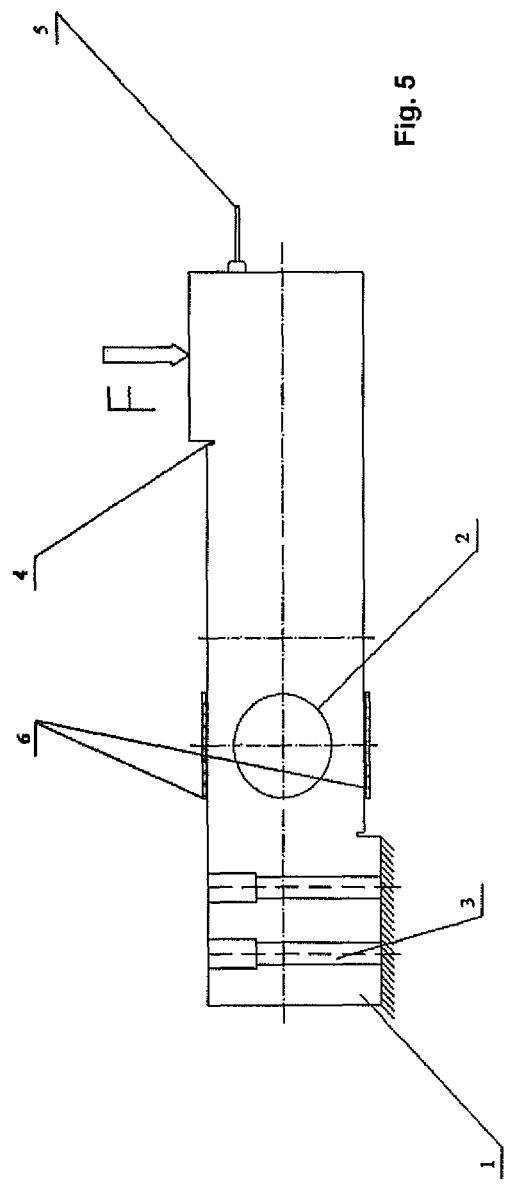
FIG. 5 shows a measurement beam as in the first embodiment, with the stress concentrator being situated on the left side of the vertical axis of symmetry of the beam.

The polymeric measuring beam presented in the embodiment is an asymmetric element with a determined working alignment. As results from the stress diagrams, the beam may be used to produce a measuring system with specific features. The embodiment presented in FIG. 3 is characterized by a greater rigidity and a longer area with a similar stress gradient compared to that presented in FIG. 5, with clearly increasing stress level in the ascending section. The example of the solution presented in FIG. 5 is characterized by a gradual increase of stress, with a short area of an elevated stress level. The solution shown in FIG. 5 makes it possible to obtain greater precision of measurements.

EMBODIMENT 3

The measuring beam as in the first embodiment, having dimensions: 130×32×30 (length×height×width expressed in mm) with a stress concentrator 2 located asymmetrically, with cylindrical delimiting surfaces which have a circular shape in the longitudinal section of the beam. The horizontal axis of the local coordinate system does not coincide with the axis of the coordinate system of core 1 of the beam element—FIG. 7 and FIG. 9. On the surface of the beam there is located a tensometric measuring system 6, but other embodiments may also use an optoelectronic measuring system or a measuring system made of a different polymeric material than the material of core 1 which responds to the laser reader of the optoelectronic system; each of said units is located in the area of highest stress and is uniformly bonded with the material of the core 1 of the beam. Additionally, core 1 of the polymeric measuring beam is provided with typical mounting holes 3, technological undercut 4 and a signal cable outlet 5.

Figure 8:
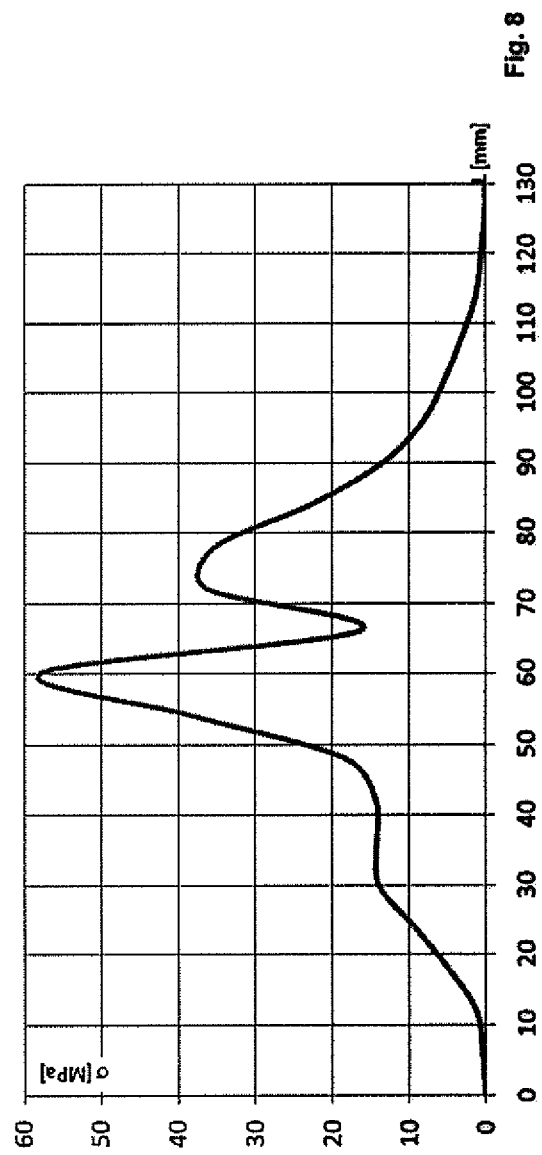
FIG. 8 shows a stress diagram for this embodiment.
Figure 10:
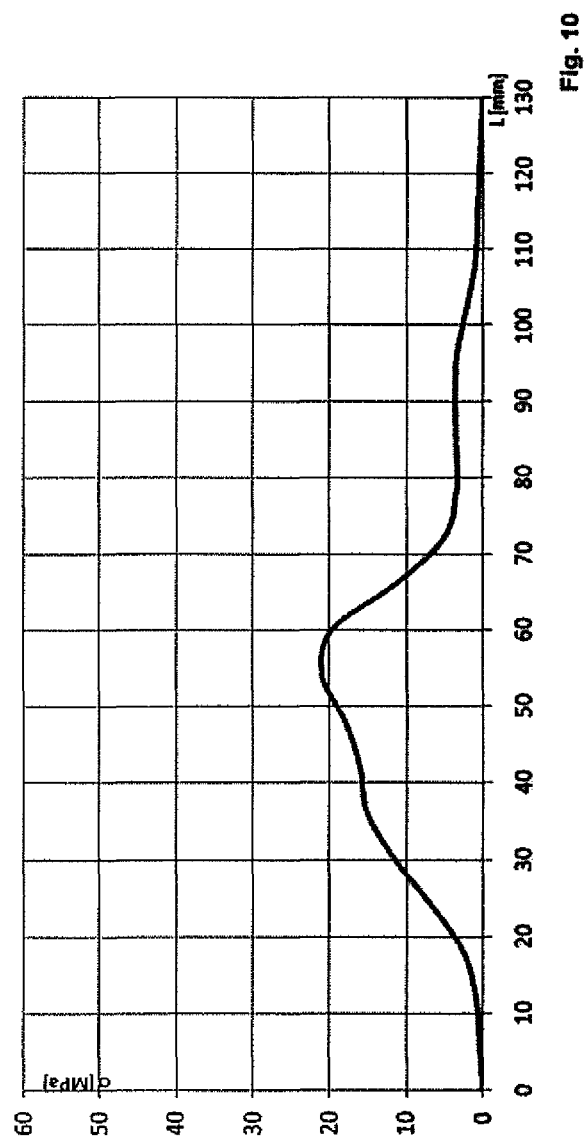
FIG. 10 shows a stress diagram for this embodiment.

The polymeric measuring beam according to the invention was examined within the whole measuring range, i.e. from 0 to 1000 N, and thus a stress distribution diagram has been obtained, presented in FIG. 8 and FIG. 10.

Figure 7:
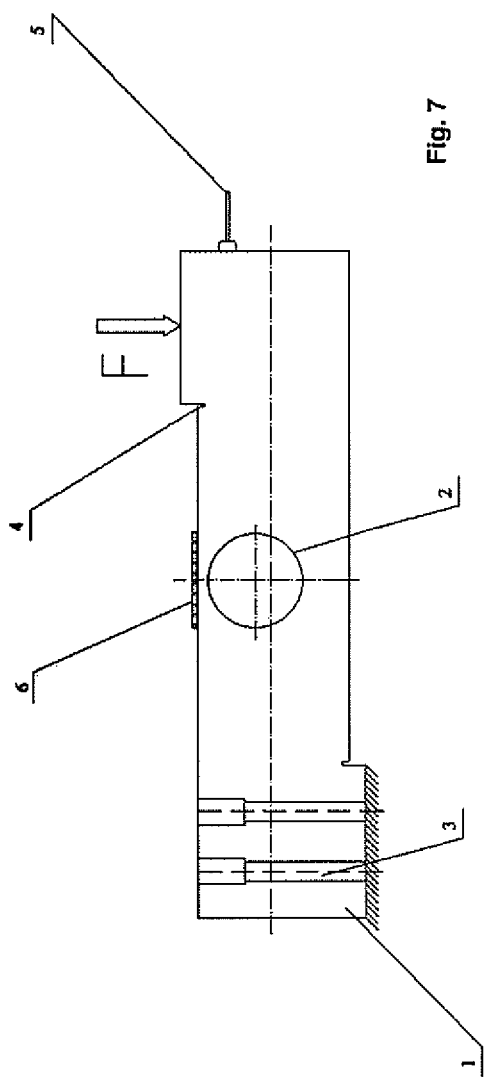
FIG. 7 shows a measurement beam with the concentrator shape as in the first embodiment, with the stress concentrator being situated above the vertical axis of symmetry of the beam.
Figure 9:
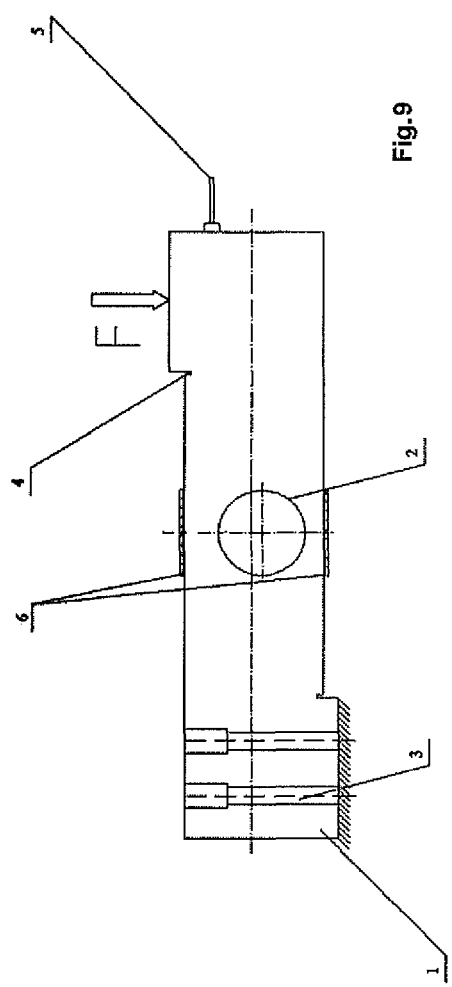
FIG. 9 shows a measurement beam with the stress concentrator shaped as in the first embodiment, the concentrator being situated below the horizontal axis of symmetry of the beam.

The polymeric measuring beam presented in the embodiment is an asymmetric element determined working alignment. As results from the stress diagrams, the beam may be used to produce a measuring system with specific features. The embodiment presented in FIG. 7 is characterized by high levels of obtained stress, the stress gradient being characterized by sharply increasing (decreasing) slope. The solution presented in FIG. 9 is characterized by a gradual increase and decrease of stress, with a clear area with an elevated stress level, which is definitely longer than that in the example presented in FIG. 7. The levels of obtained stress are approximately three times lower. Stress distributions in the discussed solutions show extremum in the axis of the beam element. The above solutions make it possible to adjust the measuring element to measurement conditions (required stress levels), change the size of measurement areas and to identify the systems' behaviour, including the assessment of such phenomena as: tension and compression.

EMBODIMENT 4

Figure 11:
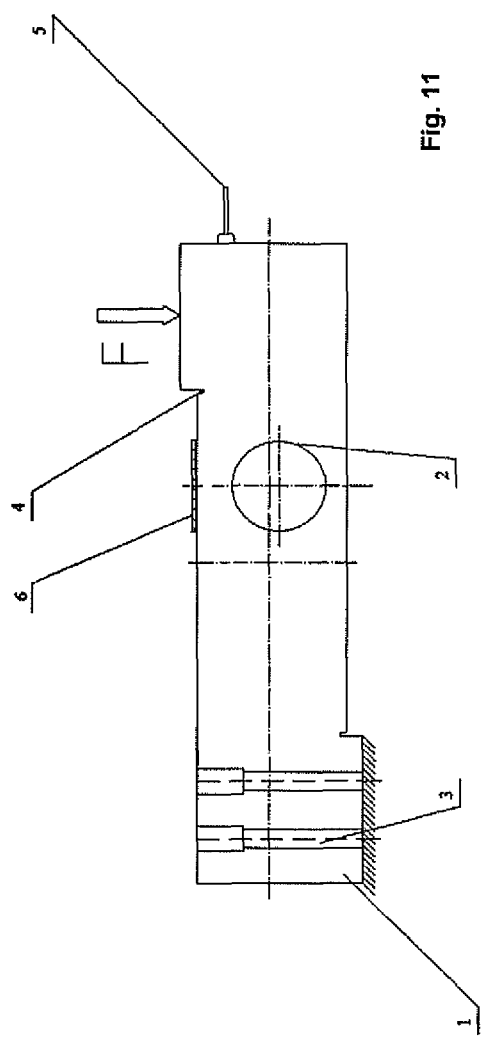
FIG. 11 shows a measurement beam with the stress concentrator shaped as in the first embodiment and displaced to the right relative to vertical axis of the beam and downwards relative to horizontal axis of the beam.

The measuring beam as in the first embodiment, having dimensions: 130×32×30 (length×height×width expressed in mm) with a stress concentrator 2 located asymmetrically, with cylindrical delimiting surfaces which have a circular shape in the longitudinal section of the beam. The vertical and horizontal axis of the local coordinate system does not coincide with the axis of the coordinate system of core 1 of the beam element—FIG. 11. On the surface of the beam there is located a tensometric measuring system 6, but other embodiments may also use an optoelectronic measuring system or a measuring system made of a different polymeric material than the material of core 1 of the beam which respond to the laser reader of the optoelectronic system; each of said systems is located in the area of highest stress and is uniformly bonded with the material of core 1 of the beam. Additionally, core 1 of the polymeric measuring beam is provided with standard mounting holes 3, technological undercuts 4 and a signal cable outlet 5.

Figure 12:
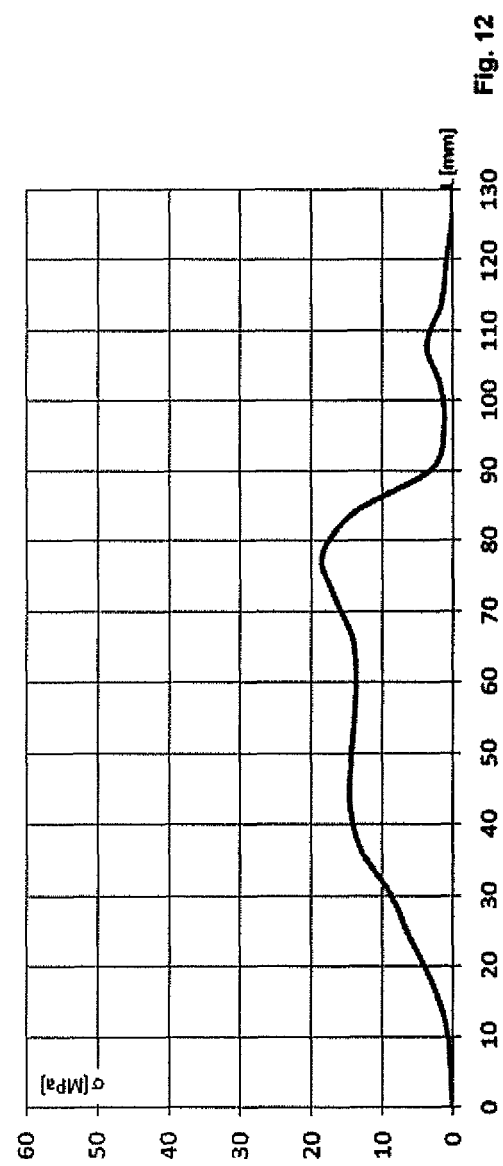
FIG. 12 shows a stress diagram for this embodiment.

The polymeric measuring beam according to the invention was examined within the whole measuring range, i.e. from 0 to 1000 N, and thus a stress distribution diagram has been obtained, presented in FIG. 12.

The polymeric measuring beam presented in the embodiment is an asymmetric element with a determined working alignment. As results from the stress diagrams, the beam may be used to produce a measuring system with specific features.

EMBODIMENT 5

The measuring beam as in the first example, having dimensions: 130×32×30 (length×height×width expressed in mm) with a stress concentrator 2, with cylindrical delimiting surfaces which have the shape of ellipse in the longitudinal section of the beam—FIG. 13. The axes of the local coordinate system of the stress concentrator 2 coincide with the axes of the coordinate system of core 1 of the measuring beam; the preferred direction defined by the longer diagonal of the ellipse is indicated. On the surface of the beam there is located a tensometric measuring system 6, but other embodiments may also use an optoelectronic measuring system or a measuring system which is made of a different polymeric material than the material of core 1 of the beam and which responds to the laser reader of the optoelectronic system; each of said units is located in the area of highest stress and is uniformly bonded with the material of core 1 of the beam. Additionally, core 1 of the polymeric measuring beam is provided with standard mounting holes 3, technological undercuts 4 and a signal cable outlet 5.

The polymeric measuring beam according to the invention was examined within the whole measuring range, i.e. from 0 to 1000 N, and thus a stress distribution graph has been obtained, presented in FIG. 14.

The polymeric measuring beam presented in the embodiment is a symmetric element without indication of preferred working alignment. As results from the stress diagram, the beam may be used to produce a measuring system with specific features. The embodiment presented in FIG. 13 is characterized by high levels of obtained stress, with stress gradients characterized by vertically increasing slope, whereas the decrease of stress level is definitely milder. There is a clearly visible extremum; the obtained stress level is more than twice as high as that in Embodiment 2. The measurement must be carried out on short length. The solution is dedicated to measuring systems wherein precision of measurements is the main criterion.

EMBODIMENT 6

The measuring beam according to the first example, having dimensions: 130×32×30 (length×height×width expressed in mm) with a stress concentrator 2, with cylindrical delimiting surfaces which have the shape of ellipse in the longitudinal section of the beam—FIG. 15. The axes of the local coordinate system of stress concentrator 2 coincide with the axes of the coordinate system of core 1 of the measuring beam. On the surface of the beam there is located a tensometric measuring system 6, but other embodiments may also use an optoelectronic measuring system or a measuring system which is made of a different polymeric material than the material of core 1 of the beam and which responds to the laser reader of the optoelectronic assembly; each of said systems is located in the area of highest stress and is uniformly bonded with the material of core 1 of the beam. Additionally, core 1 of the polymeric measuring beam is provided with standard mounting holes 3, technological undercuts 4 and a signal cable outlet 5.

The polymeric measuring beam according to the invention was examined within the whole measuring range, i.e. from 0 to 1000 N, and thus a stress distribution graph has been obtained, presented in FIG. 16.

The solution presented in the embodiment of the solution in FIG. 15 is characterized by a gradual increase and decrease in stress, with a long section of linearly decreasing slope. The area with elevated stress level is clearly marked, which is advantageous when making the measuring system. The solution of the embodiment is dedicated for systems wherein durability and invariability is essential during measurements. The solution is sensitive to temporary overload.

EMBODIMENT 7

A polymeric measuring beam is in the form of core 1 made of polyetherketone, which core 1 has a shape similar to a rectangular prism having dimensions: 140×41×30 (length×height×width expressed in mm). In the central part of core 1 of the beam there is located a shaped stress concentrator 2 with cylindrical delimiting surfaces which have the shape of a drop in the longitudinal section of the beam—FIG. 17. The shape of the stress concentrator has been designed assuming a lack of symmetry of the delimiting surfaces: the upper one and the lower one relative to the axis of the coordinate system of the beam element. The shape of the upper and the lower curve delimiting the surfaces of the stress concentrator is not the same. The embodiment of the solution presented in FIG. 17 show such case where the horizontal axis of concentrator 2 coincides with the horizontal axis of symmetry of the coordinate system of core 1 of the measuring beam.

On the surface of the beam there is located a tensometric measuring unit 6, but other embodiments may also use an optoelectronic measuring system or a measurement system which is made of a different polymeric material than the material of core 1 of the beam and which responds to the laser reader of the optoelectronic system; each of said systems is located in the area of highest stress and is uniformly bonded with the material of core 1 of the beam. Additionally, core 1 of the polymeric measuring beam is provided with standard mounting holes 3, technological undercuts 4 and a signal cable outlet 5.

The polymeric measuring beam according to the invention was examined within the whole measuring range, i.e. from 0 to 1000 N, and thus a stress distribution graph has been obtained, presented in FIG. 16.

The presented solution favours the use of particular properties of polymeric materials, which is polyetherketone in this case. The measuring beam presented in FIG. 17 is an element that had a working alignment, high rigidity, for special applications, i.e. for the construction of heavily loaded measurement systems. The element described herein is characterized by enlarged stress concentration area being displaced relative to the vertical axis of the beam, with curvilinearily modulated decreasing slope—errors, if any, in the location of tensometric or optoelectronic sensors do not affect the result of a measurement. The solution has eliminated constructional limitations of mutually adjacent small curvatures and their undesirable effect on the rigidity and fatigue wear of the element. The element described herein in characterized by an area of stress concentration located near the vertical axis of the coordinate system of core 1 of the measuring beam, o with curvilinearily modulated decreasing slope—errors, if any, in the location of tensometric or optoelectronic sensors do not affect the result of a measurement.

One advantage of the measuring beam presented in the embodiment and of similar measuring beams which meet the present concept of shape is that a change in the parameters such as beam length, description of curvilinear limiting surfaces and shape of curves delimiting the upper and lower surfaces relative to the horizontal axis of the concentrator, location of the concentrator relative to the vertical axis of symmetry of the element, makes it possible to produce a series of types of beam systems for various uses, having a desired load capacity and length of the stress concentration area.

EMBODIMENT 8

The polymeric measuring beam is in the form of a core 1 made of polyetherketone, which core 1 has a shape similar to a rectangular prism having dimensions: 140×41×30 (length×height×width expressed in mm). In the central part of core 1 of the beam there is located a shaped stress concentrator 2 with cylindrical delimiting surfaces which, in the longitudinal section of the beam, have a shape similar to a heart without the recess—FIG. 19. The shape of the stress concentrator has been designed assuming a lack of symmetry of the delimiting surfaces: the upper one and the lower one relative to the axis of the coordinate system of the beam element. The shape of the upper and the lower curve delimiting the surfaces of the stress concentrator is not the same. The present embodiment shows such case where the vertical axis of the concentrator coincides with the vertical axis of symmetry of the beam element. On the surface of the beam there is located a tensometric measuring system 6, but other embodiments may also use an optoelectronic measuring system or a measuring system which is made of a polymeric material other than the material of core 1 of the beam and which respond to the laser reader of an optoelectronic system; each of said units is located in the area of highest stress and is uniformly bonded with the material of core 1 of the beam. Additionally, core 1 of the polymeric measuring beam is provided with standard mounting holes 3, technological undercuts 4 and a signal cable outlet 5.

The polymeric measuring beam according to the invention was examined within the whole measuring range, i.e. from 0 to 1000 N, and thus a stress distribution diagram has been obtained, presented in FIG. 20.

The solution adopted favours the use of particular properties of polymeric materials, which is polyetherketone in this case. The location of the stress concentrator is defined by mutual relations between: the horizontal axis of the coordinate system of the concentrator and the horizontal axis of the coordinate system of the beam element. The solution adopted made it possible to obtain a measuring beam that: has a dedicated working alignment, high rigidity, designed for special applications, i.e. for the construction of heavily loaded measurement systems, on the basis of which it is possible to construct a measuring system for carrying out high-frequency measurements, e.g. 10 Hz, in a wide range of loads. The element described herein is characterized by enlarged stress concentration area being displaced relative to the vertical axis of the beam, with curvilinearily modulated decreasing slope—errors, if any, in the location of tensometric or optoelectronic sensors do not affect the result of a measurement.

One advantage of the measuring beam presented in the embodiment of the measuring beam and of similar measuring beams which meet the present concept of shape is that a change in the parameters such as beam length, description of curvilinear delimiting surfaces, shape of curves delimiting the upper and the lower surface relative to the horizontal axis of the concentrator, location of the concentrator relative to the vertical axis of symmetry of the element, makes it is possible to produce a series of types of beam systems for various uses, having a desired load capacity.

EMBODIMENT 9

The polymeric measuring beam is in the form of a core 1 made of polyetherketone, which core 1 has a shape similar to a rectangular prism having dimensions 160×42×30 (length×height×width expressed in mm). In the central part of core 1 of the beam there is located a shaped stress concentrator 2 with cylindrical delimiting surfaces which, in the longitudinal section of the beam, have a shape similar to a heart with a deep recess—FIG. 21. In the embodiment presented herein the horizontal axis of the local coordinate system of the stress concentrator 2 coincides with the horizontal axis of core 1 of the measuring beam. The shape of the stress concentrator has been designed assuming a lack of symmetry of the delimiting surfaces: the upper one and the lower one relative to the horizontal axis of the beam element. On the surface of the beam element there is located a tensometric measuring system 6, but other embodiments may also use an optoelectronic measuring system or a measuring system which is made of a polymeric material other than the material of core 1 of the beam and which responds to the laser reader of the optoelectronic system; each of said units is located in the area of highest stress and is uniformly bonded with the material of core 1 of the beam. Additionally, core 1 of the polymeric measuring beam is provided with standard mounting holes 3, technological undercuts 4 and a signal cable outlet 5.

The polymeric measuring beam according to the invention was examined within the whole measuring range, i.e. from 0 to 1000 N, and thus a stress distribution diagram has been obtained, presented in FIG. 22.

The solution presented is an element dedicated for measuring systems with a determined working alignment, for special applications, i.e. to carry out high precision measurements, making it possible to carry out measurements within a broad range of loads, with relatively long, within a desired linear range, area of stress concentration displaced relative to the vertical axis of the beam, with curvilinearily modulated decreasing slope; errors, if any, in the location of tensometric or optoelectronic sensors do not affect the result of a measurement.

One advantage of the measuring beam presented in the embodiment of the measuring beam and of similar measuring beams which meet the present concept of shape is that a change in the parameters such as beam length, the shape of curvilinear delimiting surfaces, location of the concentrator relative to the vertical axis of symmetry of the element, makes it is possible to produce a series of types of beam systems for various uses, and having a desired load capacity.

EMBODIMENT 10

The polymeric measuring beam is in the form of a core 1 made of polyetherketone, which core 1 has a shape similar to a rectangular prism having dimensions: 160×42×30 (length×height×width expressed in mm). In the central part of core 1 of the beam there is located a shaped stress concentrator 2 with cylindrical delimiting surfaces, with an arrangement of closed curves, each of which has a contour in the form of a circle of a different diameter—FIG. 23. In the embodiment presented herein the horizontal axis of the local coordinate system of the stress concentrator 2 coincides with the horizontal axis of core 1 of the measuring beam. The shape of the stress concentrator has been designed assuming a lack of symmetry of the delimiting surfaces: the upper one and the lower one relative to the horizontal axis of the beam element. On the surface of the beam there is located a tensometric measuring system 6, but other embodiments may also use an optoelectronic measuring system or a measuring system which is made of a different polymeric material than the material of core 1 of the beam and which respond to the laser reader of the optoelectronic assembly; each of said units is located in the area of highest stress and is uniformly bonded with the material of core 1 of the beam. Additionally, core 1 of the polymeric measuring beam is provided with standard mounting holes 3, technological undercuts 4 and a signal cable outlet 5.

The invention claimed is:

1. A polymeric measuring beam comprising:
    a beam core having a shape of a rectangular prism,
        wherein the beam core comprises a central horizontal axis of symmetry and a central vertical axis of symmetry, and
        wherein the beam core is formed from a polymer;
    a stress concentrator formed in the beam core in a shape of a closed curve,
    wherein the closed curve is confined by only two lines imposing a condition of convergence in a direction opposite to a stress increase gradient along the central horizontal axis of the beam core; and
    a measuring system coupled to the beam core in a highest area of stress of the stress concentrator,
        wherein the measuring system is uniformly bonded with the polymer of the beam core.

2. The polymeric measuring beam according to claim 1, wherein the stress concentrator comprises a central horizontal axis of symmetry that does not align with the central horizontal axis of symmetry of the beam core.

3. The polymeric measuring beam according to claim 1, wherein the stress concentrator comprises a central vertical axis of symmetry that does not align with the central vertical axis of symmetry of the beam core.

4. The polymeric measuring beam according to claim 1, wherein the measuring system is a tensometric measuring system.

5. The polymeric measuring beam according to claim 1, wherein the measuring system is an optoelectronic measuring system formed from a polymer different than the polymer of the beam core.

6. The polymeric measuring beam according to claim 5, wherein the measuring system comprises a laser reader.

7. The polymeric measuring beam according to claim 1, wherein the polymer is polyetherketone.

8. The polymeric measuring beam according to claim 1, wherein the shape of the stress concentrator is an ellipse.

9. The polymeric measuring beam according to claim 1, wherein the shape of the stress concentrator is a drop.

10. The polymeric measuring beam according to claim 1, wherein the shape of the stress concentrator is a heart.

* * * * *